(12) United States Patent
Cron et al.

(10) Patent No.: US 11,745,542 B2
(45) Date of Patent: Sep. 5, 2023

(54) CURVED REINFORCED RESILIENT SUPPORT FOR A NON-PNEUMATIC TIRE

(71) Applicants: Steven M. Cron, Simpsonville, SC (US); Damon Lee Christenbury, Greenville, SC (US); COMPAGNIE GENERALE DES ETABLISSEMENTS MICHELIN, Clermont-Ferrand (FR)

(72) Inventors: Steven M. Cron, Simpsonville, SC (US); Damon Lee Christenbury, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 463 days.

(21) Appl. No.: 16/954,919

(22) PCT Filed: Dec. 21, 2017

(86) PCT No.: PCT/US2017/067861
§ 371 (c)(1),
(2) Date: Jun. 17, 2020

(87) PCT Pub. No.: WO2019/125459
PCT Pub. Date: Jun. 27, 2019

(65) Prior Publication Data
US 2020/0376891 A1 Dec. 3, 2020

(51) Int. Cl.
*B60C 7/14* (2006.01)
*B60C 7/18* (2006.01)
(Continued)

(52) U.S. Cl.
CPC ............... *B60C 7/146* (2021.08); *B60C 7/18* (2013.01); *B60B 9/26* (2013.01); *F16F 1/368* (2013.01); *F16F 2224/0241* (2013.01)

(58) Field of Classification Search
CPC .......... B60C 7/143; B60C 7/146; B60C 7/18; B60B 9/26; F16F 1/368; F16F 2224/0241
See application file for complete search history.

(56) References Cited

U.S. PATENT DOCUMENTS

| 820,077 A | 5/1906 | Whiteley |
| 1,035,410 A | 8/1912 | Beydler |
(Continued)

FOREIGN PATENT DOCUMENTS

| EP | 0132048 | | 1/1985 | |
| FR | 1164324 A | * | 10/1958 | ............... B60B 9/26 |
(Continued)

OTHER PUBLICATIONS

International Search Report and Written Opinion Thereof, PCT Application No. PCT/US2017/067861, dated Jul. 11, 2018, 19 pages.

*Primary Examiner* — Kip T Kotter
(74) *Attorney, Agent, or Firm* — Dority & Manning, P.A.

(57) ABSTRACT

A curved support structure for a non-pneumatic tire and a tire incorporating such support structure. A support membrane extends continuously between a radially-inner end and a radially-outer end and defines opposing sides. A radially-outer joint may be provided on one of the opposing sides while a radially-inner joint may be provided on the other side of the membrane. An annular band may be incorporated with the radially-outer joint. A wheel, hub, or other structure may be incorporated with the radially-inner joint.

15 Claims, 12 Drawing Sheets

(51) Int. Cl.
 *B60B 9/26* (2006.01)
 *F16F 1/368* (2006.01)

(56) References Cited

U.S. PATENT DOCUMENTS

| | | | | |
|---|---|---|---|---|
| 1,489,231 | A | * | 4/1924 | Beisel ........................ B60B 9/26 |
| | | | | 152/12 |
| 2014/0251518 | A1 | * | 9/2014 | Abe .......................... B60C 7/22 |
| | | | | 152/75 |
| 2017/0232787 | A1 | | 8/2017 | Hasegawa et al. |

FOREIGN PATENT DOCUMENTS

| | | | | |
|---|---|---|---|---|
| JP | 2015151009 | | 6/2015 | |
| WO | WO-2010012091 A1 | * | 2/2010 | ............... B60B 9/04 |
| WO | WO2017072562 | | 5/2017 | |

* cited by examiner

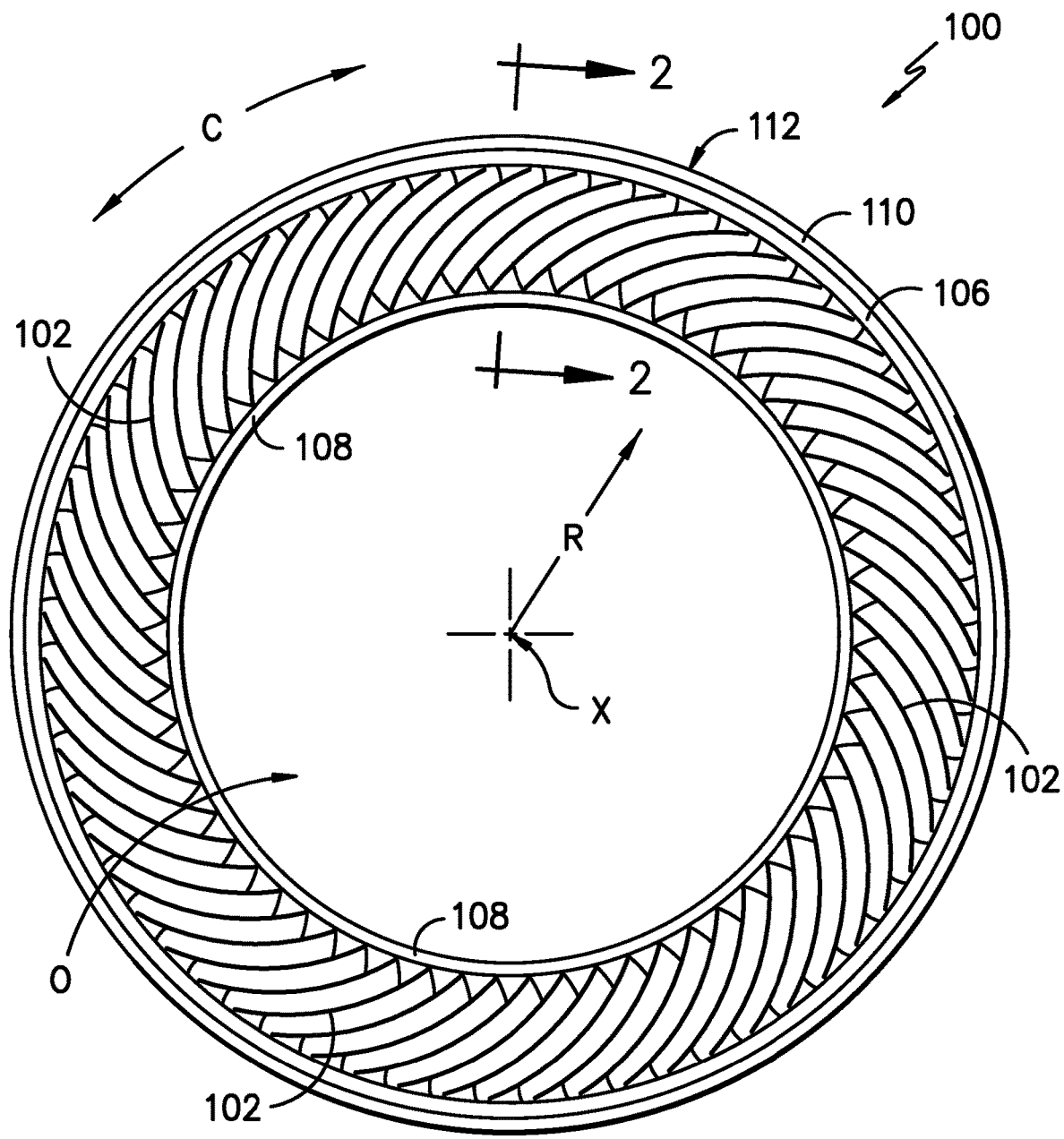
FIG. -1-

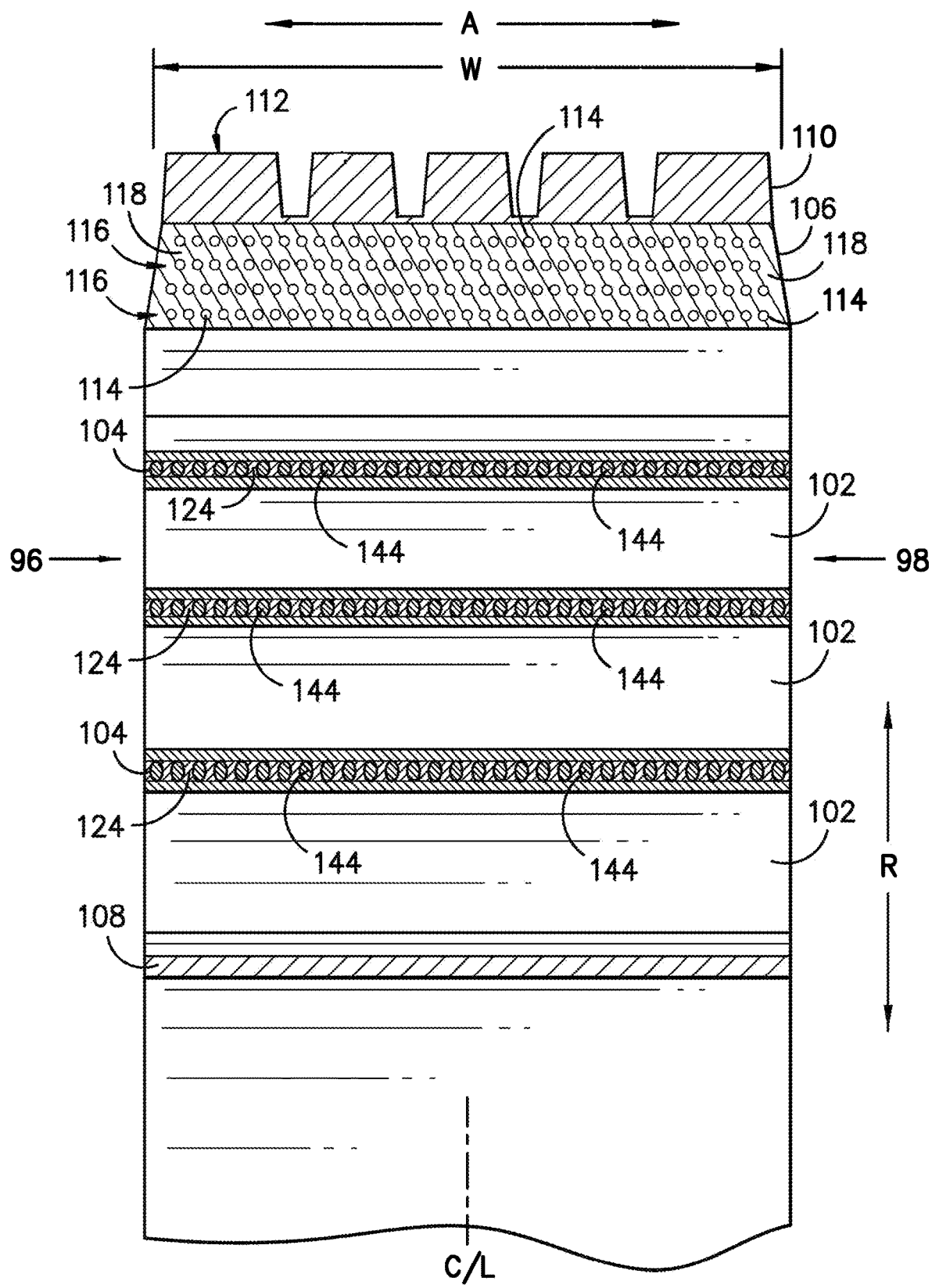
FIG. -2-

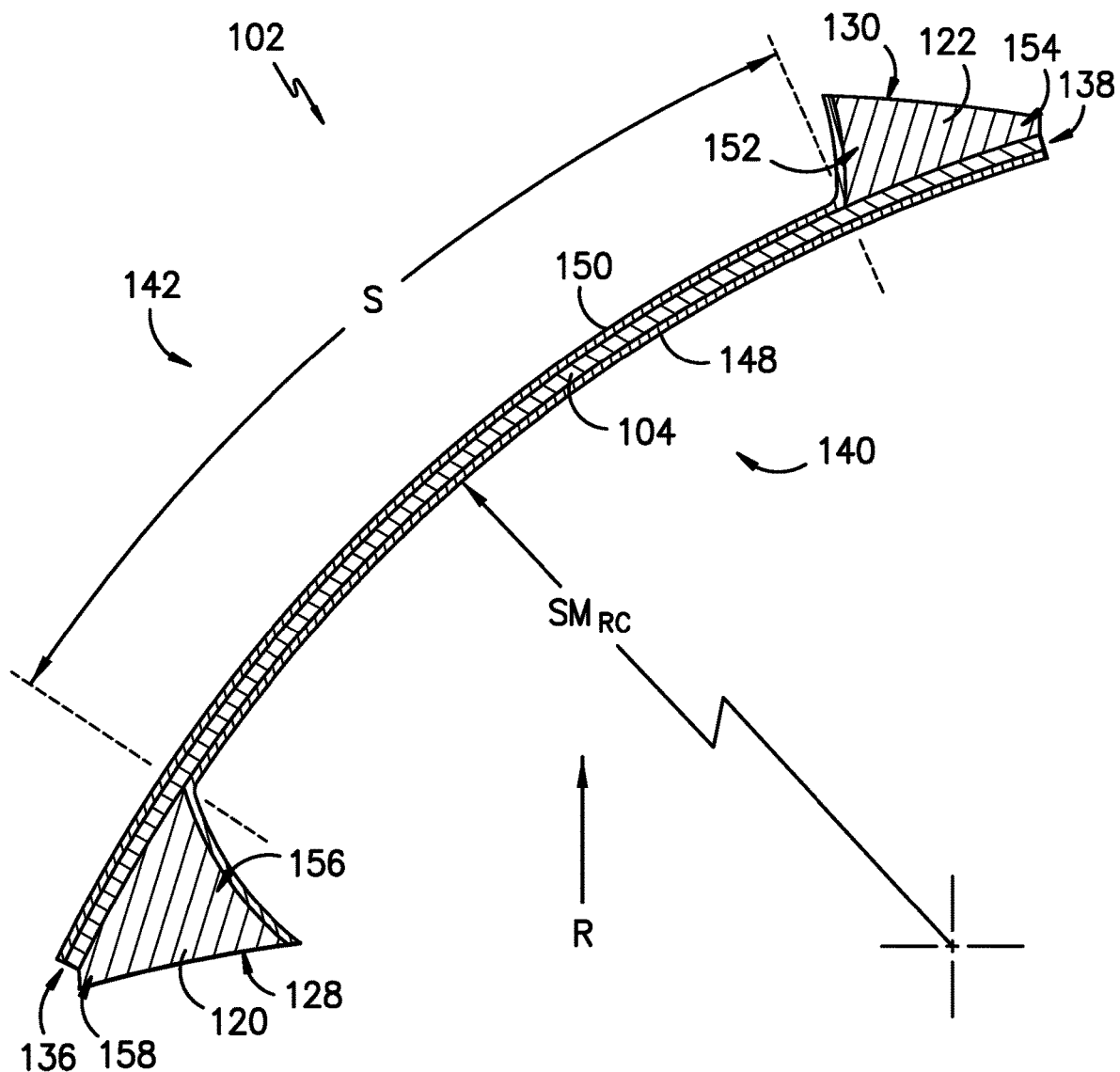
FIG. -3-

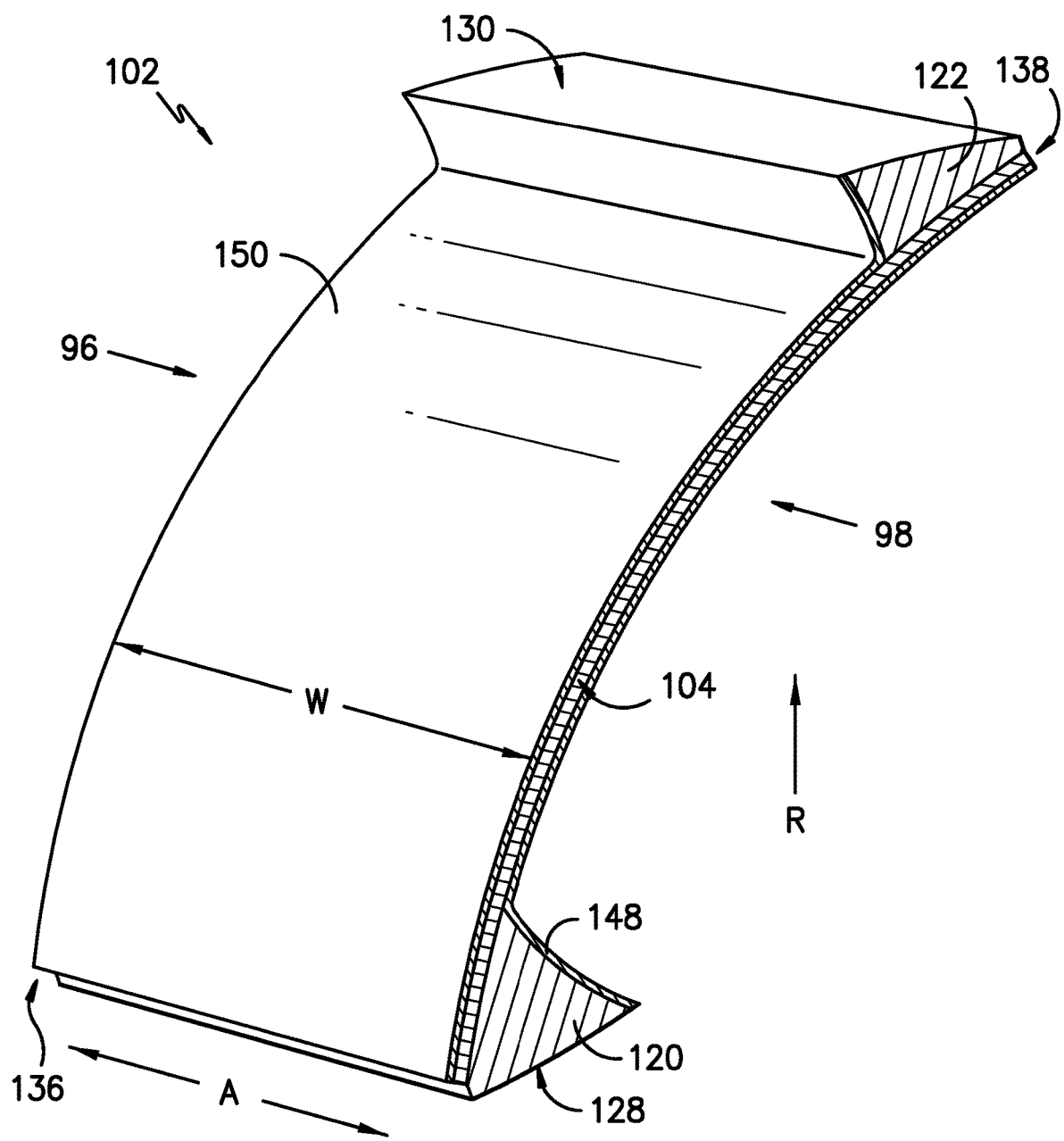
FIG. -4-

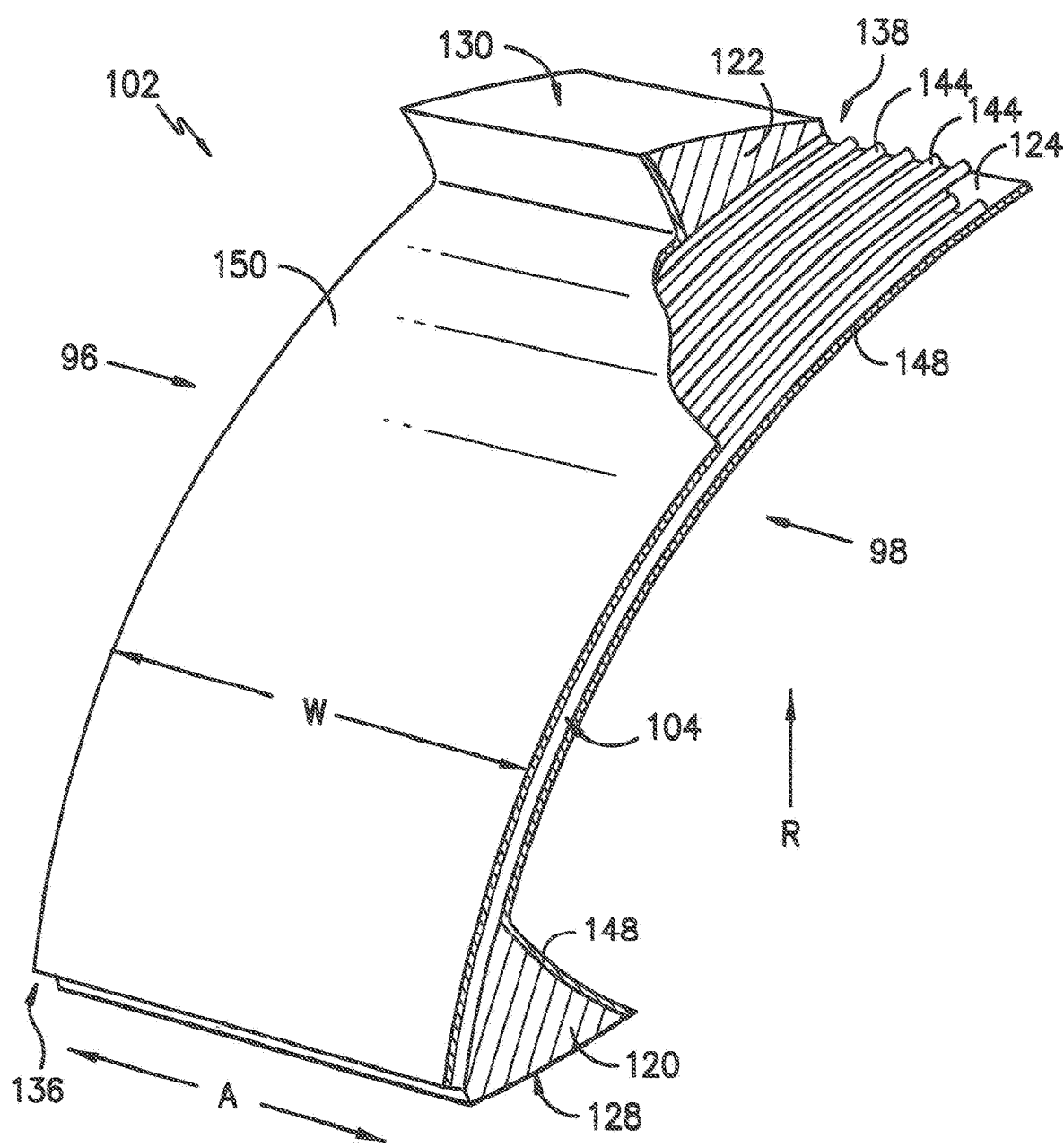
FIG. -5-

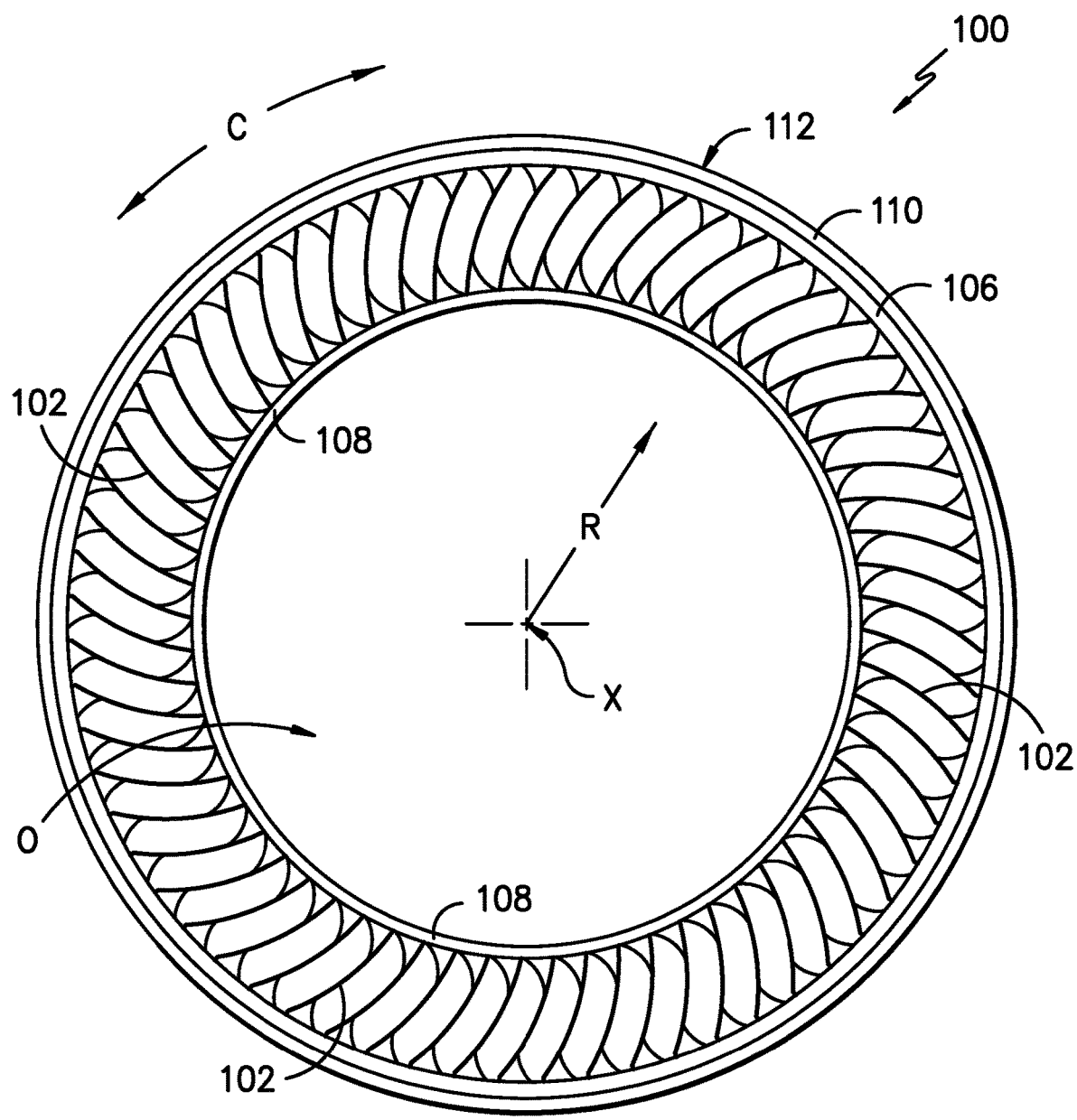
FIG. -6-

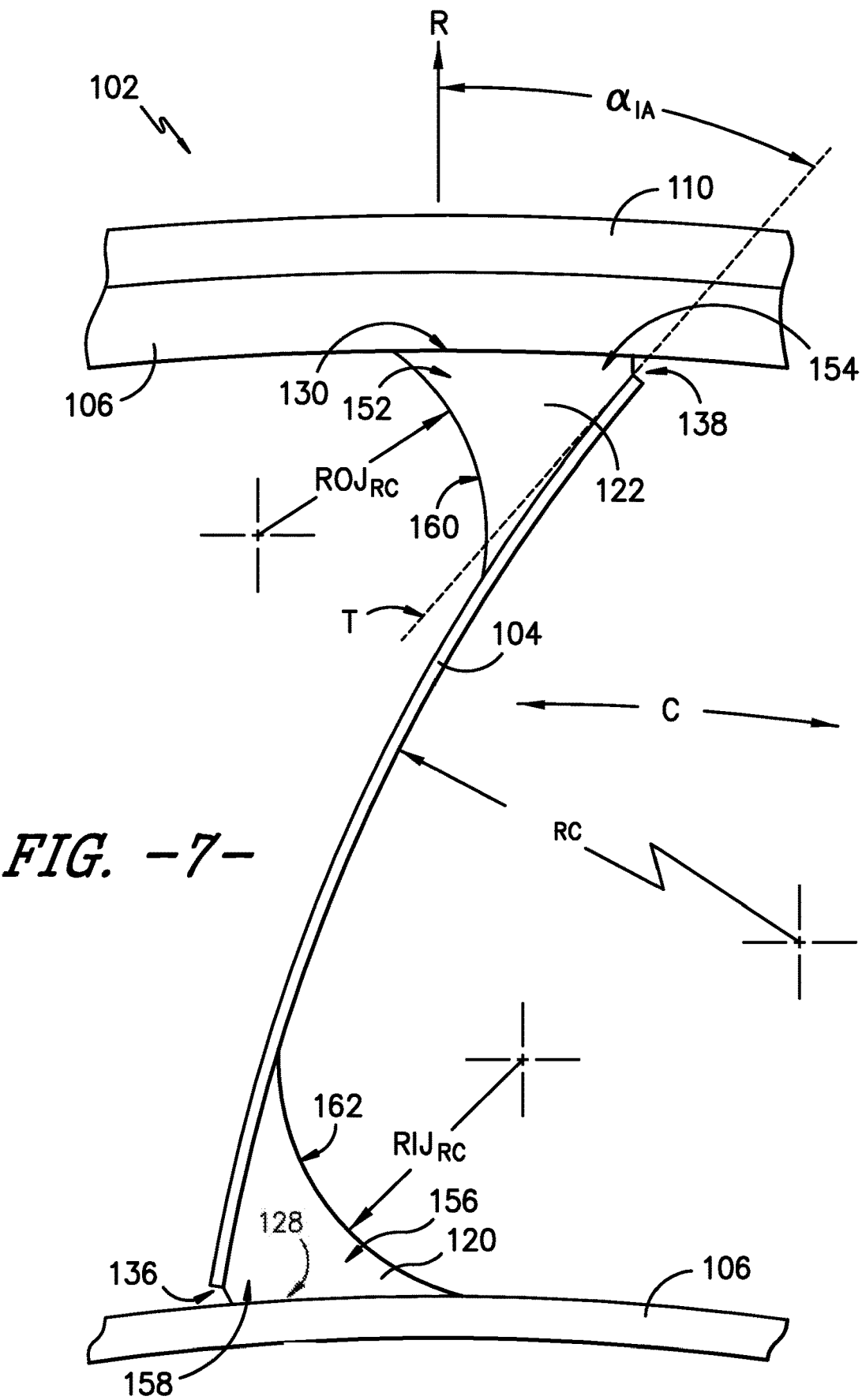
FIG. -7-

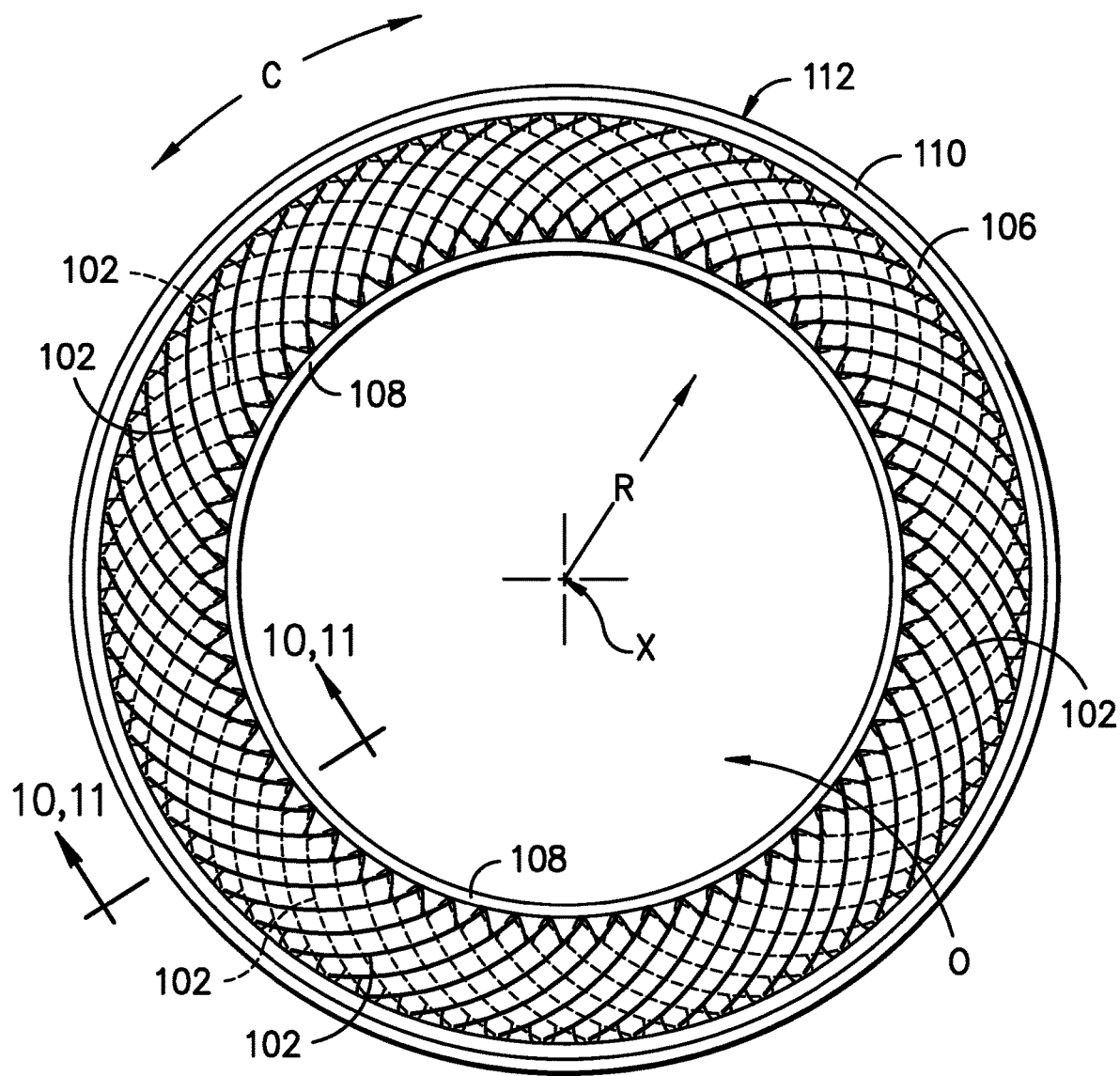
FIG. -8-

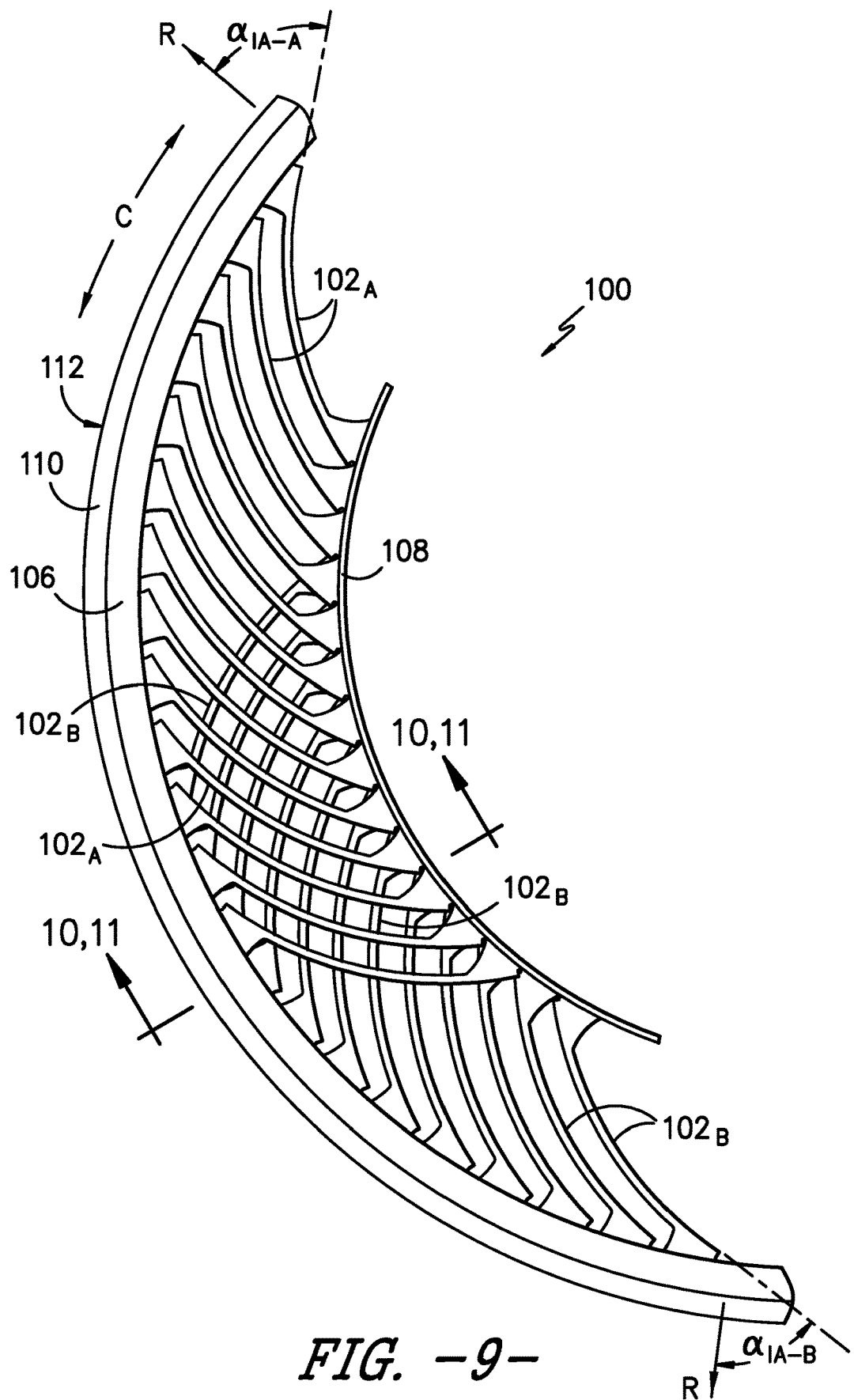
FIG. -9-

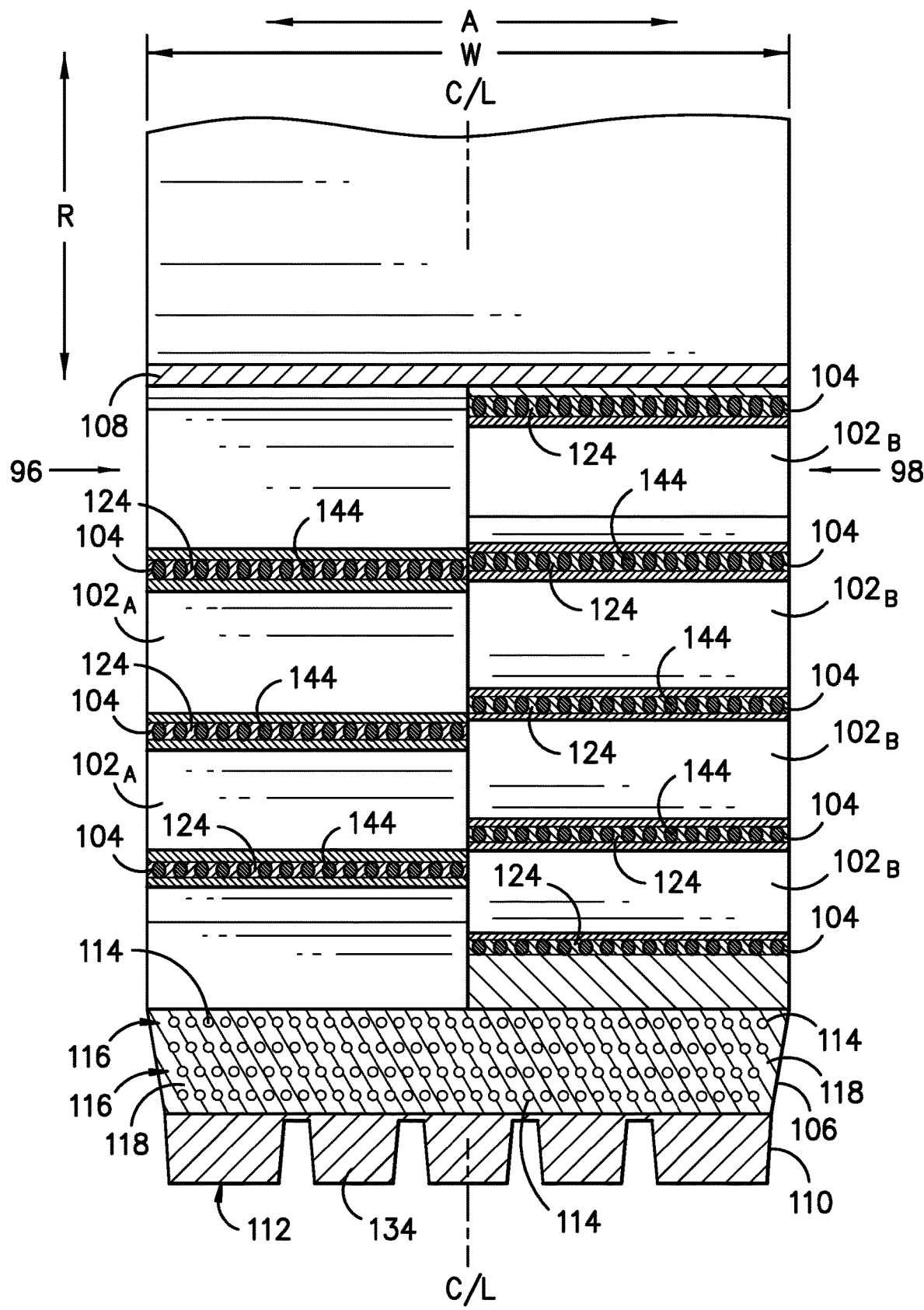
FIG. -10-

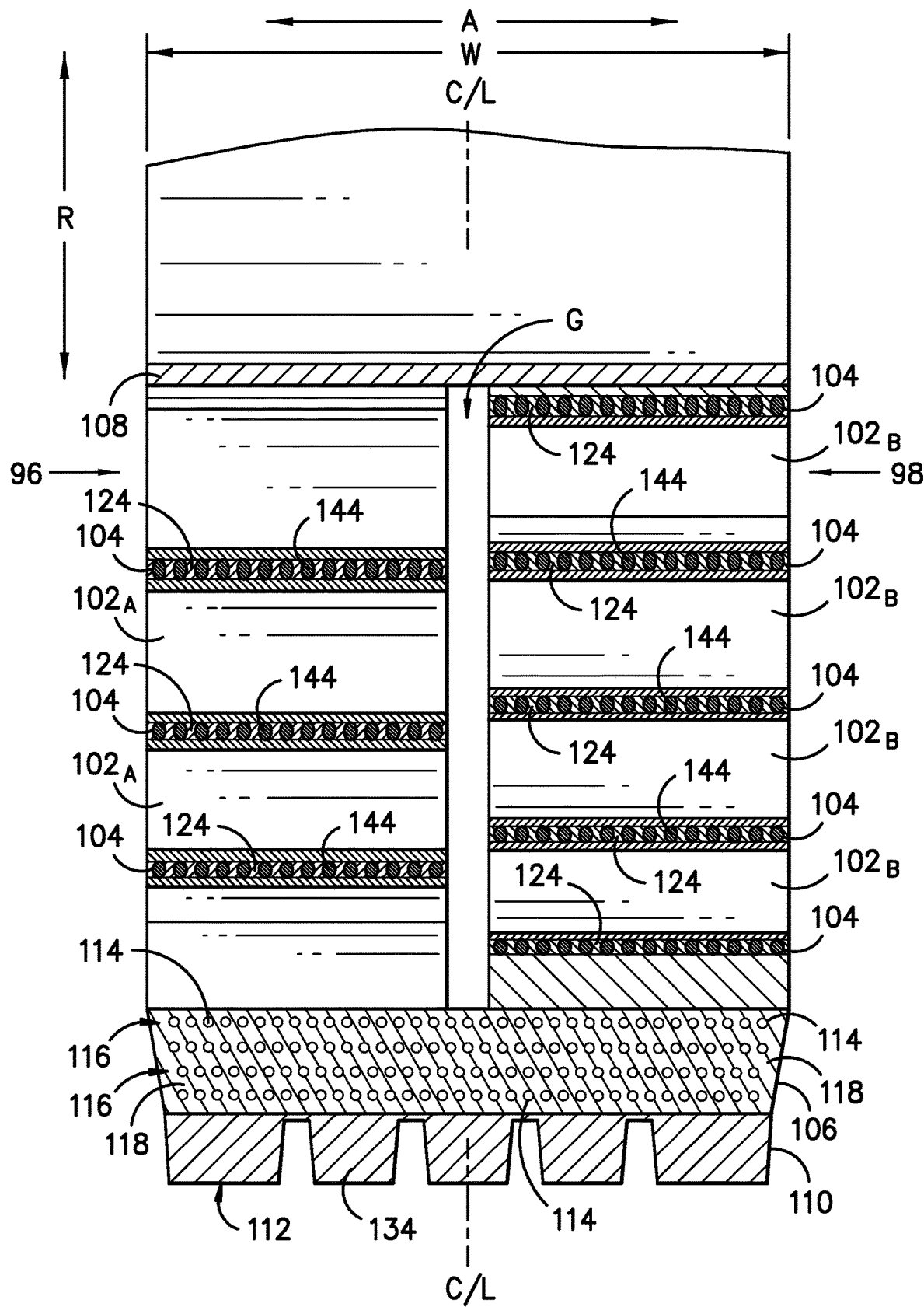
FIG. -11-

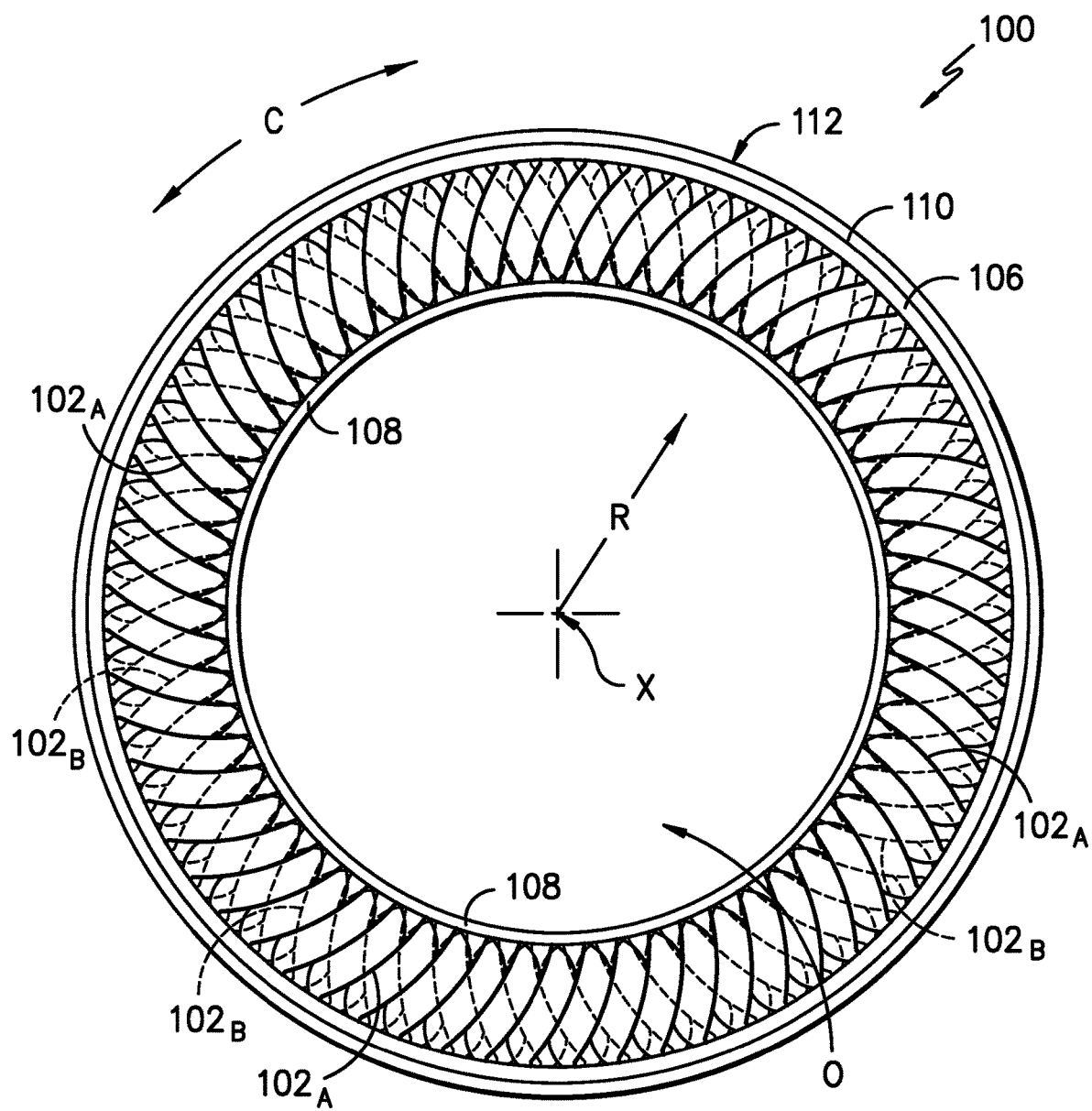
FIG. -12-

CURVED REINFORCED RESILIENT SUPPORT FOR A NON-PNEUMATIC TIRE

CROSS-REFERENCE TO RELATED APPLICATIONS

The present application is a § 371 Application of PCT/US2017/067861 filed on Dec. 21, 2017, all of which is incorporated herein by reference for all purposes.

FIELD OF THE INVENTION

The subject matter of the present disclosure relates generally to a curved, resilient and reinforced support or curved spoke for a tire and to a tire incorporating such curved support.

BACKGROUND OF THE INVENTION

The pneumatic tire is a known solution for compliance, comfort, mass, and rolling resistance. However, the pneumatic tire has disadvantages in complexity, the need for maintenance, and susceptibility to damage. A device that improves on pneumatic tire performance could, for example, provide more compliance, better control of stiffness, lower maintenance requirements, and resistance to damage.

Non-pneumatic tire or wheel constructions provide certain such improvements. The details and benefits of non-pneumatic tire or non-pneumatic wheel constructions are described in e.g., U.S. Pat. Nos. 6,769,465; 6,994,134; 7,013,939; and 7,201,194. Certain non-pneumatic tire and wheel constructions propose incorporating a resilient, annular shear band, embodiments of which are described in e.g., U.S. Pat. Nos. 6,769,465 and 7,201,194. Such non-pneumatic tire and wheel constructions provide advantages in performance without relying upon a gas inflation pressure for support of the nominal loads applied to the tire or wheel.

In some non-pneumatic constructions, vehicle load is applied to a wheel hub that is connected with an annular shear band through load bearing members in the form of e.g., multiple webs or spokes. These members can transmit the load to the annular shear band through e.g., tension, compression, or both. A layer of tread can be applied to the shear band to provide protection against the travel surface.

While non-pneumatic constructions have been proposed that provide various advantages, improvements in the ability of the non-pneumatic tire to carry loads and enhance passenger comfort while reducing mass and rolling resistance are still needed.

SUMMARY OF THE INVENTION

The present invention provides a reinforced and curved support structure for a non-pneumatic tire and a tire incorporating such resilient support structure. A support membrane extends continuously between a radially-inner end and a radially-outer end and defines opposing sides. A radially-outer joint may be provided on one of the opposing sides while a radially-inner joint may be provided on the other side of the membrane. An annular band may be incorporated with the radially-outer joint. A wheel, hub, or other structure may be incorporated with the radially-inner joint. Additional objects and advantages of the invention will be set forth in part in the following description, or may be apparent from the description, or may be learned through practice of the invention.

In one exemplary embodiment of the present invention, a resilient, composite structure for connecting with components of a tire is provided. The tire defines axial, radial, and circumferential directions. The composite structure includes a radially-outer joint for connecting with a first component of a tire, a radially-inner joint for connecting with a second component, and a support membrane. The support membrane extends continuously from the radially-outer joint to the radially-inner joint. The support membrane has a radially-outer end that is located radially inward of the radially-outer joint. The support membrane has a radially-inner end that is located radially outward of the radially-inner joint. The support membrane defines a pair of opposing sides and has an arcuate shape extending in a direction between the radially-outer joint and the radially-inner joint. The radially-inner support and the radially-outer support are movable relative to each other so as to allow bending of the support membrane. The radially-inner joint and the radially-outer joint are positioned on opposing sides of the support membrane.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of an exemplary embodiment of a tire of the present invention.

FIG. 2 illustrates a cross-sectional view of a portion of the tire of FIG. 1 taken along line 2-2 in FIG. 1.

FIG. 3 is a cross-sectional view of exemplary resilient support structure as may be used in the tire of FIGS. 1 and 2.

FIG. 4 is a perspective and cross-sectional view of the exemplary support structure of FIG. 3.

FIG. 5 provides a perspective and partial cross-sectional view of the support structure of FIGS. 3 and 4 with certain portions removed for purposes of illustration.

FIG. 6 illustrates a side view of another exemplary embodiment of a tire of the present invention.

FIG. 7 illustrates a side view of an exemplary support structure as may be used in the exemplary tire of FIG. 6.

FIG. 8 illustrates a side view of another exemplary embodiment of a tire of the present invention.

FIG. 9 is a close-up of a portion of the exemplary tire in FIG. 8.

FIG. 10 is a cross-sectional view of a portion of an embodiment of the tire of FIG. 8 taken along line 10,11-10, 11 in FIG. 8 and FIG. 9.

FIG. 11 is a cross-sectional view of a portion of another embodiment of the tire of FIG. 8 taken along line 10,11-10, 11 in FIG. 8 and FIG. 9.

FIG. 12 illustrates a side view of another exemplary embodiment of a tire of the present invention.

DETAILED DESCRIPTION

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents "Axial direction" or the letter "A" in the figures refers to a direction parallel to the axis of rotation of for example, the annular band, tire, and/or wheel as it travels along a road surface.

"Radial direction" or the letter "R" in the figures refers to a direction that is orthogonal to axial direction A and extends in the same direction as any radius that extends orthogonally from the axial direction.

"Circumferential direction" or the letter "C" in the figures refers to a direction is orthogonal to axial direction A and orthogonal to a radial direction R.

"Radial plane" means a plane that passes perpendicular to the equatorial plane and through the axis of rotation of the wheel.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance. A loading condition of less than nominal load, but more than an unloaded state, may be considered a nominal load, though deflections will likely be less than deflections at nominal load.

"Modulus" or "Modulus of elongation" (MPa) is measured at 10% (MA10) at a temperature of 23° C. based on ASTM Standard D412 on dumb bell test pieces. The measurements are taken in the second elongation; i.e., after an accommodation cycle. These measurements are secant moduli in MPa, based on the original cross section of the test piece.

Referring now to FIG. 1, an elevation view of an exemplary embodiment of a tire 100 of the present invention as may be incorporated onto a hub 108 is shown. FIG. 2 is a cross-sectional view of tire 100 taking along lines 2-2 shown in FIG. 1. During use, tire 100 rotates about an axis of rotation X that is parallel to axial direction A.

Tire 100 includes a plurality of the deflectable, reinforced structures 102 that are arranged adjacent to each other along circumferential direction C. For this embodiment, each composite structure 102 has a width W extending along axial direction A between opposing lateral sides 96 and 98. Each structure 102 is configured as a spoke-like or web-like component that, for this exemplary embodiment, extends along radial direction R between a resilient, annular band 106 and a cylindrically-shaped hub 108. The construction of each composite structure 102 is basically identical.

Tire 100 can be incorporated onto e.g., a wheel, hub, or other component positioned within or at opening O to allow tire 100 to be e.g., mounted onto an axle or other component of a vehicle so that the vehicle may roll across a ground surface. By way of non-limiting examples, such vehicle may include a passenger vehicle, heavy duty truck, light duty truck, all-terrain vehicle, bus, aircraft, agricultural vehicle, mining vehicle, bicycle, motorcycle, and others. Tire 100 may be attached to e.g., hub 108 by use of e.g., adhesives, fasteners, and combinations thereof. In still other embodiments, tire 100 and hub 108 may be integrally formed together. Other hub or wheel configurations and constructions may be used as well.

An annular tread band 110 is incorporated with resilient annular band 106. Tread band 110 may be e.g., adhered to annular band 106 or may formed integrally with annular band 106. Tread band 110 provides an outer contact surface 112 for contact with the ground or other surfaces as tire 100 rolls across. A variety of shapes and configurations may be used for tread band 100 including e.g., ribs, blocks, and combinations thereof such that the present invention is not limited to the tread shown in the figures. In other embodiments, annular band 106 may be constructed entirely from tread band 110 or integrally with tread band 110.

Annular band 106 may include a plurality of reinforcing elements 114 that each extend along circumferential direction C around tire 100 within an elastomeric layer 118. For example, elastomeric layer 118 may be constructed from one or more rubber materials, polyurethanes, and combinations thereof. Reinforcing elements 114 may be e.g., cords or cables arranged along axial direction A in multiple rows 116 within layer 118.

In one exemplary embodiment, reinforcing elements 114 are "interlaced" with respect to each other along either radial direction R or axial direction A. Where reinforcing elements 114 are interlaced along axial direction A, imaginary lines extending between the center points of reinforcing elements 114 in adjacent, axially oriented rows 116 will form a rhombus or horizontal diamond having non-orthogonal angles between the sides of the rhombus. In this interlaced, horizontal diamond configuration, reinforcing elements 114 of adjacent, axially-oriented rows 116 are closer together than reinforcing elements 114 within the same axially-oriented row 116. Where reinforcing elements 114 are interlaced along radial direction R, imaginary lines extending between the center point of reinforcing elements 114 in adjacent, axially oriented rows 116 will form a rhombus or vertical diamond having non-orthogonal angles between the sides of the rhombus. In this interlaced, vertical diamond configuration, reinforcing elements 114 along the same, axially-oriented row will be closer together than reinforcing elements in non-adjacent, axially-oriented rows. As will be understood by one of skill in the art using the teachings disclosed herein, during manufacture of tire 100, a perfect positioning of reinforcing elements 114 into the shape of a vertical or horizontal diamond may not be possible due to e.g., the movement of materials during the manufacturing process. As such, slight displacements of the reinforcement elements of either diamond configuration can occur.

Reinforcing elements 114 can be constructed from a variety of materials. For example, reinforcing elements 114 can be constructed from metallic cables, or cables that are constructed from polymeric monofilaments such as PET (polyethylene terephthalate), nylon, or combinations thereof. By way of additional example, reinforcing elements 114 could be constructed from elongate composite elements of monofilament appearance made with substantially symmetrical technical fibers, the fibers being of great lengths and impregnated in a thermoset resin having an initial modulus of extension of at least 2.3 GPa, in which the fibers are all parallel to each other. In such embodiment, the elongate composite elements will deform in an elastic manner up to a compressive strain of at least equal to 2%. As used herein, an "elastic deformation" means that the material will return approximately to its original state when the stress is released. By way of example, the fibers could be constructed from glass, certain carbon fibers of low modulus, and combinations thereof. Preferably, the thermoset resin has a glass transition temperature $T_g$ greater than 130° C. Advantageously, the initial modulus of extension of the thermoset resin is at least 3 GPa. Reinforcing elements 114 could also be constructed from combinations of PET and such elongate composite elements. Additionally, reinforcing elements 114 could be constructed from hollow tubes made from rigid polymers such as e.g., PET or nylon. Other materials may be used as well.

Resilient annular band 106 is configured to undergo deformation as tire 100 rolls across a ground surface and portions of band 106 pass through a contact patch where outer contact surface 112 makes contact with the ground surface. Through such deformation, annular band 106 can allow outer contact surface 112 to become planar in the contact patch. Annular band 106 with e.g., reinforcement elements 114 also provides strength to support and carry a nominal load applied to tire 100 through hub 108 or other means of attachment to a vehicle. As will be further described, such nominal load may be applied to annular band 106 through compression, tension, or both, of reinforced structures 102.

As tire 100 rolls across e.g., a ground surface, multiple structures 102 near the contact patch may flex under compression as the outer contact surface 112 passes through the contact patch. Structures 102 located elsewhere may also incur deflections but the greatest deflection of structures 102 will likely occur near the contact patch. At the same time, other resilient structures 102 located at portions along tire 100 away from the contact patch—such as e.g., opposite to the contact path—may also flex under tension.

FIG. 3 provides a cross-sectional view of an exemplary reinforced structure 102 while FIG. 4 provides a perspective and cross-sectional view of reinforced structure 102. FIG. 5 is another perspective view of structure 102 but with portions of various components removed to reveal certain features a further described herein. For this exemplary embodiment, the cross-sectional profile in FIG. 3 is continuous along axial direction A as structure 102 extends axially over tire 100 from side 96 to opposing side 98 (FIG. 2) of tire 100.

Each structure 102 includes a radially-outer joint 122 and a radially-inner joint 120. As shown, joints 120 and 122 are spaced apart from each other along radial direction R with joint 120 being radially inward of joint 122. By way of example, joint 120, 122 may each be constructed from an elastomeric material that extends continuously along axial direction A of tire 100. In this embodiment, joints 120 and 122 have a polygonal shape with thicker sides 152 and 156 each facing along support membrane 104 in a direction towards an opposing end 136 and 138, respectively.

For this exemplary embodiment, along one side, radially-outer joint 122 includes a radially-outer connecting surface 130 that is continuous along axial direction A and has a width along circumferential direction C. As best seen in FIG. 3, surface 130 is slightly convex or curved along circumferential direction C for this embodiment. Connecting surface 130 can be incorporated with a first component of a tire such as e.g., resilient annular band 106. For example, connecting surface 130 can be adhered (e.g., using a cyanoacrylate adhesive), bonded, mechanically connected, and/or integrally formed with annular band 106. In other embodiments, radially-outer joint 122 may be incorporated with e.g., tread band 110, annular band 106, or combinations thereof.

Similarly, along an opposing side, radially-inner joint 120 includes a radially-inner connecting surface 128. For this exemplary embodiment, connecting surface 128 is also continuous along axial direction A and has a width along circumferential direction C. As best seen in FIG. 3, surface 128 is slightly concave or curved along circumferential direction C for this embodiment. Connecting surface 128 can be e.g., incorporated with a second component such as e.g., hub 108. For example, connecting surface 128 can be adhered, bonded, mechanically connected, and/or integrally formed with hub 108. In other embodiments, radially-inner joint 120 may be incorporated with e.g., hub 108, a wheel, or combinations thereof.

In one exemplary aspect of the invention, joint 120 and/or 122 may be connected with other components of tire 100 (e.g., with hub 108 or annular band 106) by creating such components from uncured rubber and then curing the rubber components together to form an integral construction. Similarly, in another exemplary aspect, one or more strips of green rubber could be placed between cured or partially cured components and used to cure them together.

In another exemplary aspect of the invention, joints 120 and 122 are constructed from a relatively soft rubber. In one exemplary embodiment, a rubber having a modulus in the range of 1 MPa to 10 MPa can be used. In still another embodiment, a rubber having a modulus of about 4.8 MPa may be used.

A support membrane 104 extends continuously from radially-inner joint 120 to radially-outer joint 122 and axially between opposing sides 96 and 98. Support membrane 104 includes a radially-inner end 136 that is adjacent to radially-inner joint 120 and is positioned radially outward of radially-inner joint 120. Radially-inner end 136 is connected to radially-inner joint 120. For this exemplary embodiment, radially-inner end 136 is a free end in that it is not directly connected or attached to hub 108 and, instead, is connected with (or attached) only to radially-inner joint 120, which is positioned between radially-inner end 136 and hub 108.

Support membrane 104 also includes a radially-outer end 138 that is adjacent to radially-outer joint 122 and is positioned radially inward of radially-outer joint 122. Radially-outer end 138 is connected to radially-outer joint 122. For this exemplary embodiment, radially-outer end 138 is a free end in that it is not directly connected or attached to annular band 106 and, instead, is connected with (or attached) only to radially-outer joint 122, which is positioned between radially-outer end 138 and annular band 106.

As shown in the figures, each support membrane 104 has a pair of opposing sides 140 and 142. Each side 140 and 142 faces an adjacent resilient structure 102 of tire 100 along circumferential direction C (FIG. 1). Notably, joints 120 and 122 are not on the same side of support membrane 104 and, instead, are positioned on opposing sides of support membrane 104. More particularly, radially-inner joint 120 is positioned radially-inward on opposing side 140 while radially-outer joint 122 is positioned radially-outward on opposing side 142. In addition, as shown in FIG. 3 for this exemplary embodiment, joints 120 and 122 do not overlap along the length L of support membrane 104. Instead, joints 120 and 122 are separated by a distance S, the magnitude of which depends on e.g., the overall size (diameter) of tire 100, the radial distance between hub 108 and band 106, and other variables. Also, for this embodiment, radially-inner end 136 is positioned adjacent to a tip of joint 120 at thinner side 158 (FIG. 3). Similarly, radially-outer end 138 is positioned adjacent to a tip of joint 122 at thinner side 154.

In one exemplary aspect, support membrane 104 has a curved or arcuate shape as viewed along axial direction A. The arcuate shape extends fully between radially-inner end 136 and radially-outer end—i.e. no linear portions along its length from end 136 to end 138. When not supporting a nominal load, support membrane 104 may have a smooth radius of curvature $SM_{RC}$ (FIG. 3) between radially-inner end 136 and radially-outer end 138. The magnitude for radius of curvature $SM_{RC}$ will depend on e.g., the overall size of tire 100, the height along radial direction R of each support 102, and other variables. In one exemplary embodiment, when tire 100 is not supporting a load, radius of curvature $SM_{RC}$ is in the range of 50 mm to 1000 mm. In one particular embodiment, for example, tire 100 has a radius of curvature $SM_{RC}$ of 150 mm.

Resilient structures 102, including support membrane 104 may be constructed and reinforced in a manner that provides a desired flexural rigidity such that each may deform resiliently as structures 102 are placed under e.g., tension and compression during operation of tire 100. For example, support membrane 104 may be constructed to have a flexural rigidity of approximately 140,000 N-mm² as measured e.g., by ASTM D709. Other values may be used as well.

To meet the mechanical properties required for resilient structure 102 including the appropriate flexural rigidity, different constructions may be used for support membrane 104. For the exemplary embodiment illustrated in the figures, support membrane 104 is constructed as a reinforced layer that includes a plurality of elongate reinforcements 144 (FIG. 5). Such reinforcements 144 are positioned adjacent to each other along axial direction A and extend continuously along radial direction R from radially-inner end 136 to radially-outer end 138. Reinforcements 144 may be surrounded within an elastomeric material 124 (FIG. 5) forming part of support membrane 104.

In one exemplary aspect, elongate reinforcements 144 may have a diameter of about 1 mm and may be spaced apart from each other along axial direction A at a pace of about 2 mm as measured at radially inner end 136 or radially outer end 138. Other pacings and diameters may be used as well depending upon e.g., the application for tire 100.

In certain exemplary embodiments, reinforcements 144 may be e.g., constructed from filaments formed by pultrusion of a glass reinforced resin. The filaments may have a modulus in the range of 10 GPa to 100 GPa. In still another embodiment, the filaments may have a modulus e.g., approximately 40 GPa. Other materials for construction of reinforcements 144 may be used as well including e.g., carbon fiber such as graphite epoxy, glass epoxy, aramid reinforced resins or epoxy, and combinations thereof. Fiber-reinforced plastic reinforcements 144 or metallic reinforcements 144 may also be used provided such have sufficient flexural rigidity for the nominal loads to be supported by tire 100.

In still another embodiment, support membrane 104 could be constructed from a fiber reinforced plastic. For example, support membrane could be constructed as a layer of fiberglass reinforced resin where the fiberglass is formed of e.g., filaments created by pultrusion of a glass reinforced resin. The filaments may have a modulus in the range of 10 GPa to 100 GPa. In still another embodiment, the filaments may have a modulus e.g., approximately 40 GPa. Although shown as a single layer, support membrane 104 may be constructed from multiple layers as well in certain embodiments.

Radially-outer end 138 of support membrane 104 is attached to radially-outer joint 122 and is allowed to compress or stretch radially-outer joint 122 during operation of tire 100. Similarly, radially-inner end 136 of support membrane 104 is attached to radially-inner joint 120 and is allowed to compress or stretch radially-inner joint 120 during operation of tire 100.

Each resilient structure 102 may have an opposing pair of coverings or outer layers 148, 150 made of a rubber or other elastomeric material. Outer layers 148, 150 on opposing sides 140, 142 of the support membrane 104 of each resilient structure 102. In one exemplary aspect, coverings 148, 150 may each have a modulus of approximately 5 MPa.

During operation of tire 100 as it rolls across a surface, some resilient structures 102 may be placed in compression while other structures 102 may be placed in tension. As previously stated, support membrane 104 of each support structure 102 is not connected directly to hub 108 or annular band 106. As such, during tension or compression as tire 100 rolls across a surface, ends 136 and 138 may move relative to each other and relative to hub 108 and annular band 106. While not intending to be bound to any particular theory, the action of structures 102 during operation of tire 100 will now be generally described with reference to FIG. 3.

During compression, structure 102 may be deformed or flexed. In such state, radially-outer joint 122 may undergo highest compression along a portion nearest thicker side 152 and may undergo lowest compression or tension along a portion nearest opposing thinner side 154. Similarly, during compression, radially-inner joint 120 may undergo compression along a portion nearest thicker side 156 and may under lowest compression or tension on an opposing thinner side 158.

Conversely, during tension, structures 102 may be deformed or flexed. In such state, radially-outer joint 122 may undergo highest tension along a portion nearest thicker side 152 and may undergo lowest tension or compression on an opposing, thinner side 154. Similarly, during tension, radially-inner joint 120 may undergo highest tension along portion nearest thicker side 156 and may undergo lowest tension or compression on an opposing, thinner side 158.

FIG. 6 illustrates another embodiment of tire 100 in which support structures 102 are positioned at a different angle along radial direction R between hub 108 and annular band 106. FIG. 7 provides a side view of a resilient structure 102 for this embodiment with features that may be used in some or all embodiments. As shown, radially-outer joint 122 has an exposed, thick side exterior surface 160 while radially-inner joint 120 also has an exposed, thick side exterior surface 162. Surfaces 160 and 162 face in opposing directions. For this embodiment, each surface 160 and 162 is slightly concave. Surface 160 has a radius of curvature $ROJ_{RC}$ and surface 162 has a radius of curvature $RIJ_{RC}$. In one exemplary aspect, the radiuses of curvature $ROJ_{RC}$ and $RIJ_{RC}$ each have a value of 20 mm.

In an unloaded state, support membrane 104 of each spoke or resilient structure 102 forms an inclination angle $\alpha_{IA}$ at radially-outer end 138. More particularly, inclination angle $\alpha_{IA}$ is the angle between radial direction R and a line T tangent to support membrane 104 at radially-outer end 138. In one exemplary embodiment of the invention, angle $\alpha_{IA}$ is in the range of 5 degrees to 50 degrees (5 degrees≤angle $\alpha_{IA}$≤50 degrees). For example, in one exemplary embodiment, angle $\alpha_{IA}$ is about 40 degrees and radius of curvature $SM_{RC}$ is about 150 mm.

As previously stated, for the embodiments of tire 100 shown in FIGS. 1 through 5 and then FIGS. 6 and 7, support structures 102 extend continuously from opposing side 96 to opposing side 98. However, other configurations of support structures 102 may be used to create still other embodiments of tire 100.

For example, FIGS. 8, 9 and 10 depict an exemplary embodiment of tire 100 that utilizes a plurality of sets of support structures 102, in this case two, on opposing sides of tire 100. The two sets 102$_A$ and 102$_B$ have different and opposing orientations. More specifically, the support structures 102$_A$ and 102$_B$ are similar in configuration to those shown in FIGS. 1 through 5. As best viewed in FIG. 9 from one opposing side 98, a first set 102$_A$ along opposing side 98 has an inclination angle $\alpha_{IA-A}$ that is equal but opposite to the inclination angle $\alpha_{IA-B}$ of a second set 102$_B$ along opposing side 96. For example, if inclination angle $\alpha_{IA-A}$ is 40 degrees, then inclination angle $\alpha_{IA-B}$ is negative 40 degrees. In addition, each set of support structures 102$_A$ and 102$_B$ extends only partially along the full width W of tire 100. For this exemplary embodiment, each set of support structures 102$_A$ and 102$_B$ extends for about one-half of width W of tire 100—i.e. from an opposing side 96 or 98, respectively, to centerline C/L. More than two sets of support structures may be used as well.

In another embodiment, each set of support structures 102$_A$ and 102$_B$ might extend a width that is more or less than one-half of width W. For example, FIG. 11 depicts the cross-sectional view of another exemplary embodiment of tire 100 where each set of support structures 102$_A$ and 102$_B$ extends for about 45 percent of width W of tire 100—i.e. from an opposing side 96 or 98, respectively, to centerline C/L. The leaves a small gap G between the sets of support structures 102$_A$ and 102$_B$ along the centerline C/L. In another embodiment, each set of support structures 102$_A$ and 102$_B$ might extend a different width that is more or less than 45 percent of width W.

FIG. 12 provides another exemplary embodiment of tire 100 that also utilizes two sets of support structures 102 having different and opposing orientations. The support structures 102 are similar in configuration to those shown in FIGS. 6 and 7. A first set 102$_A$ along opposing side 98 has an inclination angle $\alpha_{IA-A}$ that is equal but opposite to the inclination angle $\alpha_{IA-B}$ of a second set 102$_B$ along opposing side 96. In addition, each set of structures 102$_A$ and 102$_B$ can extend fully are only partially along the full width W of tire 100 as previously described.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A non-pneumatic tire defining axial, radial, and circumferential directions, the tire comprising:
   an annular band;
   a hub positioned radially inward of the annular band;
   a plurality of resilient, composite structures extending between the annular band and the hub, each composite structure comprising:
      a radially-outer joint connected with the annular band;
      a radially-inner joint connected with the hub, wherein the radially-outer joint and the radially-inner joint each comprise an elastomeric material;
      a support membrane extending continuously from the radially-outer joint to the radially-inner joint, the support membrane having a radially-outer end that is located radially inward of the radially-outer joint, the radially-outer end connected only to the radially-outer joint, the support membrane having a radially-inner end that is located radially outward of the radially-inner joint, the radially-inner end connected only to the radially-inner joint, the support membrane defining a pair of opposing sides in the circumferential direction, the support membrane having an arcuate shape extending from the radially-outer joint to the radially-inner joint; and
   wherein the radially-inner joint and the radially-outer joint are movable relative to each other so as to bend the support membrane, and wherein the radially-inner joint is positioned on a first side of the opposing sides of the support membrane and the radially-outer joint is positioned on a second side of the opposing sides of the support membrane.

2. The non-pneumatic tire of claim 1, wherein the support membrane comprises a fiber reinforced plastic.

3. The non-pneumatic tire of claim 2, further comprising an elastomer surrounding the fiber reinforced plastic.

4. The non-pneumatic tire of claim 1, wherein the support membrane comprises a plurality of elongate supports positioned adjacent to each other along the axial direction and extending along the radial direction from the radially-inner joint to the radially-outer joint.

5. The non-pneumatic tire of claim 4, wherein the support membrane further comprises an elastomeric material surrounding the plurality of elongate supports.

6. The non-pneumatic tire of claim 1, wherein the support membrane forms a radius of curvature between the radially-outer joint and the radially-inner joint.

7. The non-pneumatic tire of claim 1, wherein the radially-inner joint and the radially-outer joint do not overlap along the support membrane.

8. The non-pneumatic tire of claim 1, wherein the radially-inner joint and the radially-outer joint each extend continuously along an axial direction of the tire.

9. The non-pneumatic tire of claim 1, wherein the radially-outer joint defines a radially-outer connecting surface incorporated with the annular band of the tire.

10. The non-pneumatic tire of claim 1, wherein the radially-inner joint defines a radially-inner connecting surface incorporated with the hub.

11. The non-pneumatic tire of claim 1, further comprising an elastomeric covering positioned onto the opposing sides of the support membrane.

12. The non-pneumatic tire of claim 1, wherein the radially-outer joint defines a radially-outer connecting surface incorporated with the annular band of the tire, the annular band having a tread surface incorporated therein.

13. The non-pneumatic tire of claim 1, wherein the radially-inner joint comprises a rubber having a modulus in the range of 1 to 10 MPa.

14. The non-pneumatic tire of claim 13, wherein the radially-outer joint comprises a rubber having a modulus in the range of 1 to 10 MPa.

15. The non-pneumatic tire of claim 1, wherein the plurality of resilient composite support structures comprises a plurality of sets of support structures on opposing sides of the tire, the plurality of sets of support structures having different and opposing orientations.

\* \* \* \* \*